Sept. 11, 1956 F. J. SOMERS 2,762,861
MAGNETIC VIDEO RECORDING AND REPRODUCING
Filed Aug. 30, 1954 5 Sheets-Sheet 1

INVENTOR.
Frank J. Somers
BY Ahl R. Goshaw
ATTORNEY.

Sept. 11, 1956 F. J. SOMERS 2,762,861

MAGNETIC VIDEO RECORDING AND REPRODUCING

Filed Aug. 30, 1954 5 Sheets-Sheet 2

INVENTOR.
Frank J. Somers
BY Orl R. Goshaw
ATTORNEY.

Sept. 11, 1956 F. J. SOMERS 2,762,861

MAGNETIC VIDEO RECORDING AND REPRODUCING

Filed Aug. 30, 1954 5 Sheets-Sheet 3

INVENTOR.
Frank J. Somers
BY Vel R. Goshaw
ATTORNEY.

MAGNETIC VIDEO RECORDING AND REPRODUCING

Filed Aug. 30, 1954

INVENTOR.
Frank J. Somers
BY Val R. Gosham
ATTORNEY.

MAGNETIC VIDEO RECORDING AND REPRODUCING

Filed Aug. 30, 1954 5 Sheets-Sheet 5

INVENTOR.
Frank J. Somers
BY Sol R. Goshaw
ATTORNEY

United States Patent Office 2,762,861

Patented Sept. 11, 1956

2,762,861

MAGNETIC VIDEO RECORDING AND REPRODUCING

Frank J. Somers, Los Angeles, Calif., assignor to Radio Corporation of America, a corporation of Delaware Application August 30, 1954, Serial No. 452,880

29 Claims. (Cl. 178—6.6)

This invention relates to magnetic recording and reproduction, and particularly to the magnetic recording and reproduction of video or picture signals having a frequency spectrum approximately between 60 cycles and 4 magacycles per second.

The magnetic recording of video signals has been heretofore accomplished by the use of a single track and a single recording head when the magnetic recording medium, such as tape or film, is advanced at a rate of substantially 360 inches per second. At this rate, it is obvious that a considerable length of tape is required for a certain length television program. For instance, a fifteen-minute television program might require a length of tape of approximately 27,000 feet. This is not only expensive but involves serious mechanical problems from the standpoint of reel sizes and uniform tape speed across the recording and reproducing heads. Other systems have been tried where the video signals are recorded in multiple tracks using electronic switching to bring the various recording heads into operation in the time division mode of operation for reducing the tape speed by a factor approximating the number of tracks. This system has not been too successful for television because of the precise timing required of the electronic switching system and the difficulty in getting the multiple tracks to match up well enough to allow the reproduction of the television picture free from spurious diagonal lines and other blemishes.

The present invention is directed to a system for recording and reproducing video signals which eliminates the above defects. This system provides a magnetic signal scanning system in which the electrical information in each television scanning line is recorded in a transverse track across the width of the tape or other magnetic medium. The constant linear advancement of the tape provides the other direction of scanning corresponding to the vertical scanning of the television image. There are thus recorded "magnetic pictures" or "frames" of picture information corresponding to the original television picture. Virtually, the entire tape area is thereby utilized, resulting in a simpler and more economical magnetic recording system.

The principal object of the invention, therefore, is to facilitate the recording and reproduction of video or picture signals.

Another object of the invention is to provide an improved system for video magnetic tape recording and reproduction.

A further object of the invention is to provide an improved magnetic tape scanning system in which the scanning of individual transverse lines of video information is accomplished magnetically without the use of moving parts.

A still further object of the invention is to provide an improved magnetic recording and reproducing system for television picture information in the form of "magnetic images" which utilize substantially the entire area of the magnetic medium.

The novel features which are believed to be characteristic of this invention, both as to the manner of its organization and the mode of its operaton, will be better understood from the following description, when read in conjunction with the accompanying drawings, in which.

Figures 1, 2, 3, 5, 6:
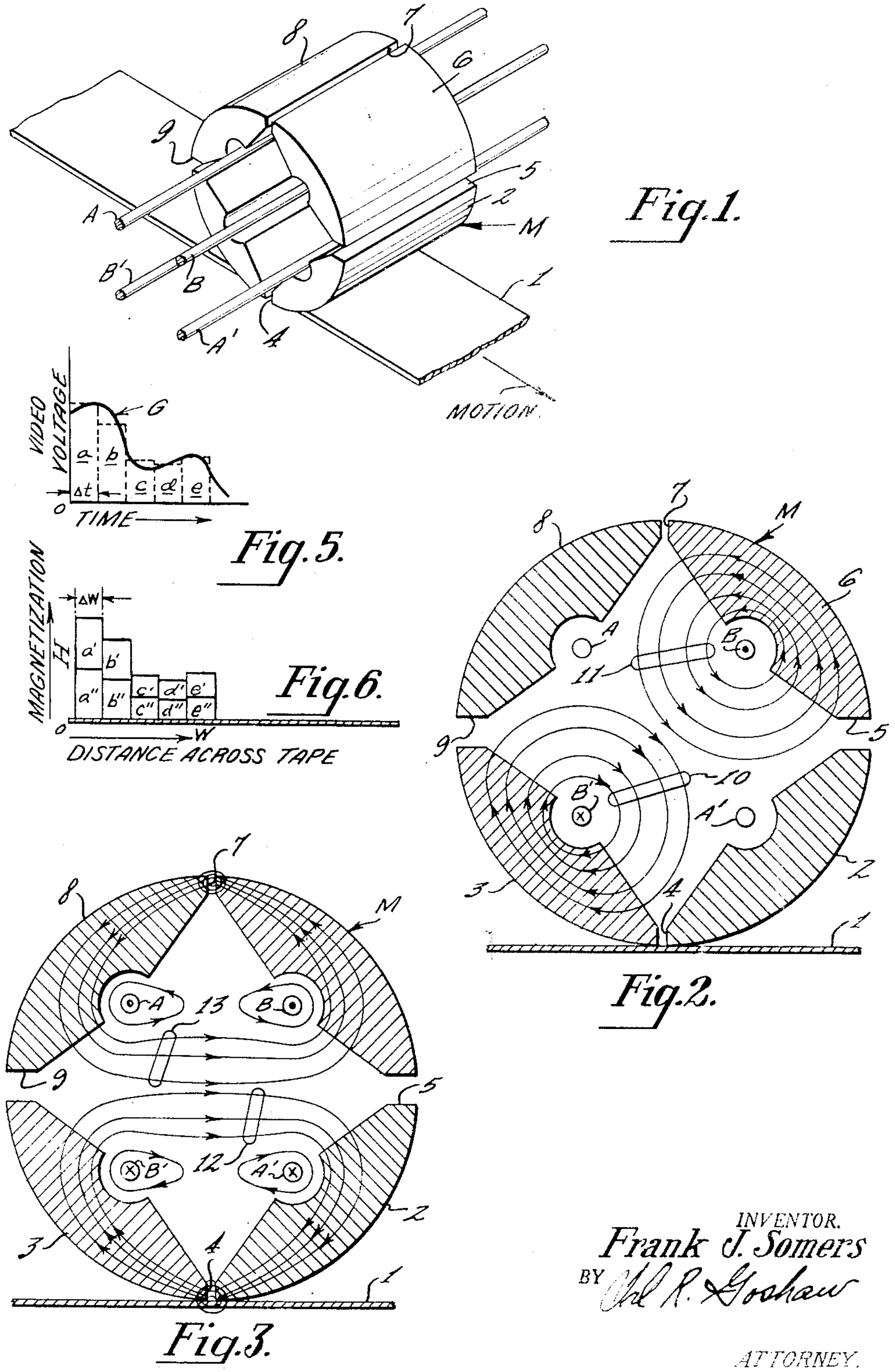
Fig. 1 is a perspective view of a magnetic recording head embodied in the invention and employing two sets of transmission lines.
Fig. 2 is a diagrammatic cross-sectional view of the head of Fig. 1 and showing the magnetic fields set up in the head when current flows through only one set of transmission lines.
Fig. 3 is a diagrammatic cross-sectional view of the magnetic head of Fig. 1 and showing the magnetic fields set up in the head when current flows through both sets of transmission lines.
Fig. 5 is a graph illustrating the relationship between a video signal and time.
Fig. 6 is a graph showing the relationship between tape width and magnetization produced by the video signal.

Referring now to the drawings, and particularly to Fig. 1, a magnetic tape 1 of standard commercial type comprising a thin plastic base coated with finely-divided iron oxide particles is shown in contact with a gap 4 of a special, substantially cylindrical, magnetic head M over which the tape is advanced by a mechanism not shown. The gap 4 is of the same size as a diametrically positioned gap 7 in the special head M made up of four sectors 2, 3, 6, and 8. Larger gaps 5 and 9 are positioned diametrically opposite one another to balance the reluctance of the sectors 2, 3, 6, and 8. The sectors 2, 3, 6, and 8 may be formed of powdered magnetic material such as finely-divided eelctrolytic iron, in which each particle is insulated from its adjacent particle in the manner of the powdered iron cores commonly used for radio frequency tuning in radio and television receivers. Within the cylinder, and diametrically opposite one another is one pair of radio frequency transmission lines A—A', and rotated 90° another pair of lines B—B', these lines extending exteriorly of the head to any desired distance.

The cross section of the head M shown in Fig. 2 shows the sectors 2, 3, 6, and 8 cross-hatched. All other areas inside the cylinder, except the transmission line conductors A—A' and B—B', are of non-magnetic material of a dielectric nature, such as air or some solid dielectric such as titanium dioxide. The dot in the center of the transmission line B indicates current flowing toward the viewer, while the cross in the center of the transmission line B' indicates current flowing away from the viewer. The resultant magnetic fields produced by these currents are shown by the lines of force 10 and 11. It will be noted that the magnetic fields 10 and 11 are confined to the core material in sectors 3 and 6 and to the dielectric space between conductors B and B′ and that there is no magnetic field across the narrow gap 4. The gaps 5, 7, and 9 provide high reluctance magnetic paths tending to prevent the flux produced by the currents in conductors B—B′ from spreading to sectors 2 and 8, and it should be noted that the net M. M. F. tending to force flux around the outer periphery of sectors 2, 3, 6, and 8 is zero. The narrow gap 4 is used for recording on the tape 1, while narrow gap 7 is placed opposite gap 4 to preserve symmetry of the system and to provide a high reluctance path between sectors 6 and 8. Gap 7 also performs an electrical balancing function in the reproduction process as described hereinafter.

With only one pair of transmission lines, such as B—B′, carrying current, there is no flux across recording gap 4. When conductors A—A′ are carrying current and not conductors B—B′, the same form of magnetic field will be set up in sectors 2 and 8 and in the dielectric space between conductors A—A′, and as illustrated for conductors B—B′, there will be no flux developed across gap 4 by conductors A—A′ acting alone.

Referring now to Fig. 3, the resultant magnetic fields are shown when both transmission lines A—A′ and B—B′ are functioning simultaneously. The resultant magnetic lines of force are illustrated at 12 and 13, it being noted that a magnetic field is now produced across the recording gap 4, and the flux density in this gap will be high because of the shape of the pole pieces, and the fringe flux will penetrate the tape 1, and cause it to become magnetized at that point. Thus, a current and magnetic field condition shown in Figs. 2 and 3 will be produced equally well by direct currents flowing in the transmission lines as well as by alternating currents at a given instant when the directions of current flow are as illustrated in these figures. The present invention utilizes fields produced by high frequency pulses of current propagated along transmission lines A—A′ and B—B′.

Figure 4:
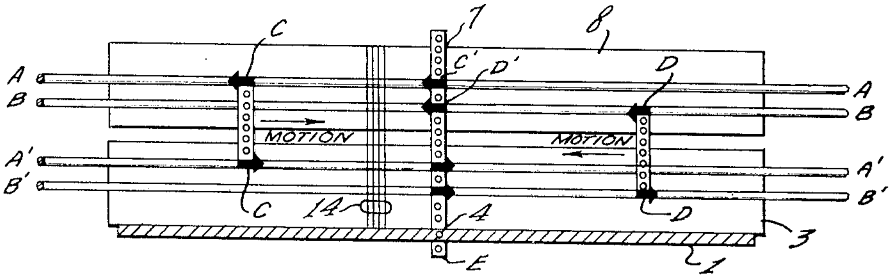
Fig. 4 is a diagrammatic view illustrating the scanning operation of the magnetic head shown in Fig. 1.

Referring now to Fig. 4, the propagation of high frequency current pulses along the transmission lines is explained. In Fig. 4, the sectors 2 and 6 have been removed to aid in explaining how the invention operates, transmission lines A—A′ and B—B′ being shifted slightly for this purpose.

In Fig. 4, C represents an electrical wave pulse entering on transmission lines A—A′ and travelling from left to right. This pulse is propagated by voltage and current distributions which travel along together and mutually sustain each other, as explained in a book by Franklin and Terman entitled "Transmission Line Theory." For the sake of clarity, the lines of electric force associated with the pulse C are not shown, but the magnetic fields are illustrated by the small circles. In Fig. 4, another pulse D is illustrated as entering on transmission lines B—B′ from the right, the heavy arrows again indicating the current flow and the small circles representing the magnetic field set up by the currents. Thus, the wave pulses C and D are travelling toward each other, the currents in A and B being toward the left, and the currents in A′ and B′ being toward the right, a condition obtained when the electric fields associated with pulses C and D are of opposite polarity. The magnetic fields associated with pulse D will be shown in Fig. 2, as D alone will not force any flux across gap 4. Similarly, pulse C alone will not force any flux across gap 4.

When the pulses C and D coincide, as illustrated at the center of Fig. 4, which corresponds to the condition shown in Fig. 3, the magnetic field E corresponds to the field 12 in Fig. 3. Since the two fields produced by pulses C and D supplement one another, a magnetic "dot" will be recorded on tape 1 at this instant. The total width of the dot will be the width of one of the pulses C′ or D′, which are of equal length. Since the core pieces, or sectors 2, 3, 6, and 8, are constructed of finely-divided electrolytic iron, with each particle insulated from the other, and since other magnetic paths have a higher reluctance, the flux E will be prevented from spreading along the whole length of the gap 4. Thus, the width of a given dot will not exceed the width of the wider of the two pulses C′ or D′. If necessary, the core pieces could be further sub-divided into extremely thin laminations, as indicated at 14, to prevent any spreading of the flux if such occurred. These laminations could be a very thin insulating material coated with electrolytic iron.

In the operation of the invention, the intensity of the magnetization of the tape 1 by the coincidence of the two pulses C′ and D′ is proportional to the strength of the pulse currents, weak pulses causing a weak magnetic dot on the tape and strong pulses causing a correspondingly intense magnetization. Therefore, each pair of pulses recording a magnetic picture element on the tape would have a strength corresponding to the strength of the instantaneous video signal. Thus, if the timing of the trains of the pairs of pulses is properly regulated, they can be made to pass each other at various points transversely of the tape in orderly progression from left to right, and if, at the same time, the strength of each pair of pulses is modulated by the video signals, a transverse line of video information will be recorded across the tape.

To further illustrate the above operation, reference is made to Figs. 5 and 6, wherein G represents a wave of video voltage versus time. If the abcissa in Fig. 4 is divided into small time elements, $\Delta t$, we have incremental video voltages $a$, $b$, $c$, $d$, and $e$. This video voltage will generate pairs of pulses on the lines A—A′ and B—B′ proportional thereto, and these pulses will provide currents $a'$ and $a''$, $b'$ and $b''$, $c'$ and $c''$, etc., which are timed to pass each other to magnetize the tape, as shown in Fig. 6. The result is the curve shown in Fig. 6 between tape width W versus magnetization H. Upon the completion of the scanning of one horizontal line of video information, the process will be repeated for the next horizontal line of video information, the tape being pulled at a slow uniform rate across gap 4, such as ten inches per second. This is slow compared with present video recording systems.

Figure 7:
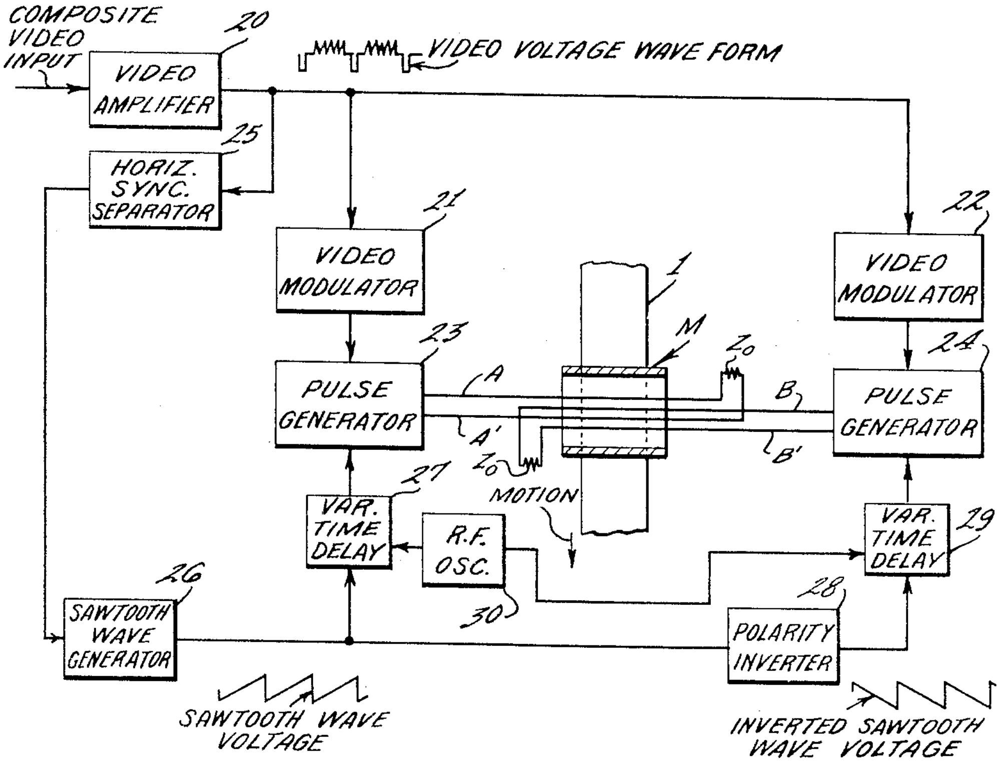
Fig. 7 is a diagrammatic circuit diagram showing the circuit units used in the recording operation.

Referring now to Fig. 7 which shows other elements of the magnetic tape recording system, composite video signals, including video and synchronizing information, are fed into an amplifier 20, of conventional design, providing uniform amplification for a frequency band of between 60 cycles to 4 or more megacycles. Amplifier 20 feeds a horizontal synchronizing separator amplifier 25, the output of which consists of horizontal frequency synchronizing pulses only. Separator 25 is of conventional design, similar to the amplifier and clipper systems used in standard television receivers. A generator 26 of saw-toothed voltage waves of horizontal frequency is fed by separator 25, this generator being a standard unit used in television receivers. The saw-toothed voltage wave from unit 26 is then fed to a variable time-delay unit 27 and to a polarity inverter 28. Saw-toothed voltage waves of one polarity are, therefore, fed to the variable time-delay unit 27, and saw-toothed voltage waves of the opposite polarity are fed to a variable time-delay unit 29. Also feeding units 27 and 29 is a radio frequency oscillator 30.

The output of the variable time-delay unit 27 is the radio frequency oscillator voltage from oscillator 30, delayed in time by an amount depending upon the instantaneous value of the saw-toothed wave. This radio frequency sine wave is fed to a pulse generator 23, which feeds pulses of the same frequency and phase into transmission line A—A′ through head M, the amplitude of these pulses being modulated by the output of a video modulator 21. The operation of a pulse generator 24 feeding transmission lines B—B′ is identical to the operation of pulse generator 23 except that pulses from unit 24 receive different amounts of delay due to the opposite polarity of the saw-toothed waves being fed to it. The timing is such that at the beginning of each scanning line, pulses from unit 23 receive a maximum delay while those from unit 24 receive a minimum delay. Thus, the scanning pulses in the transmission lines first pass each other at the left-hand extremity of the tape 1, and, as time progresses, the saw-toothed waves vary the amount of delay or phase shift applied to the oscillator voltage from units 27 and 29, so that pulses from unit 24 enter line B—B′ progressively later, while pulses from unit 23 enter line A—A′ progressively earlier. At the mid-point of the saw-toothed waves, the pulses pass each other at the center of the tape 1. At the end of the saw-toothed waves, the pulses pass each other at the right-hand extremity of the tape.

Each of the transmission lines A—A′ and B—B′ is terminated in its characteristic impedance by a resistor $Z_0$ so that pulses arriving at the end of the line are absorbed and not reflected back to the pulse generator units. As mentioned above, the units 20, 25, 26, and 28, are well known in the art, while circuit diagrams of the non-standard items are illustrated in Fig. 8 and will now be described.

Figure 8:
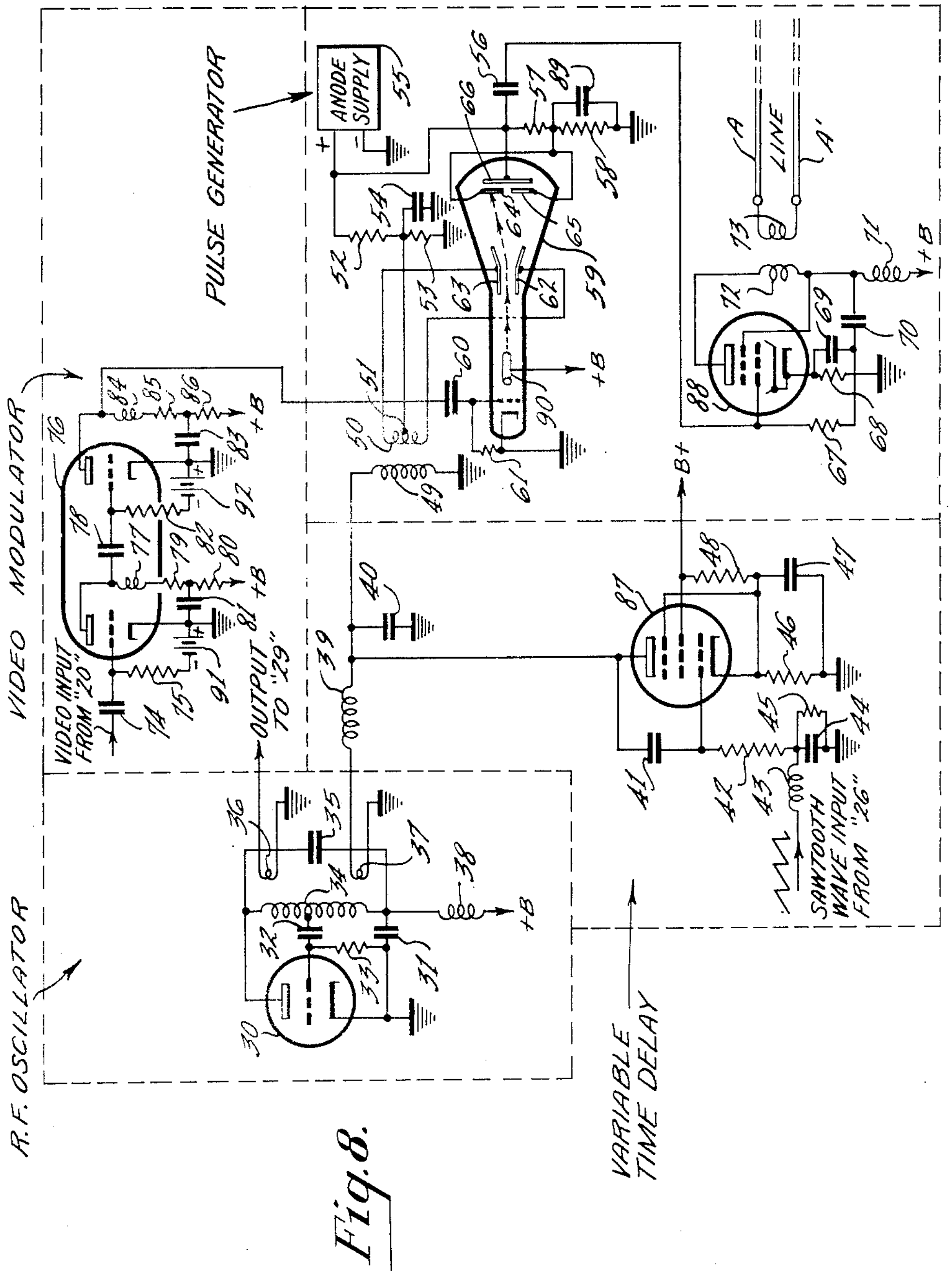
Fig. 8 is a schematic circuit diagram showing a portion of the system shown in Fig. 7.

Referring now to Fig. 8, radio frequency oscillator 30 is a triode tube connected in the well known Hartley circuit where 32 is the grid blocking capacitor and 33 is the grid leak. One end of capacitor 32 is connected to the junction of grid leak 33 and the grid of tube 30, the other end is connected to a tap on the tank coil 34, the position of the tap being chosen experimentally for optimum oscillations. The tuning capacitor 35 is chosen so that it tunes the tank coil 34 to the desired oscillation frequency. The cathode of tube 30 is connected to ground, and "B" voltage is fed to the plate of tube 30 through the filter choke 38, which has a high impedance to the frequency of oscillation, and through the winding 34. A by-pass capacitor 31 is provided to give a low impedance alternating current path to ground from the lower end of the tank coil 34 to the cathode of tube 30. Pickup coils 36 and 37 are inductively coupled to the tank coil 34 for the purpose of feeding the energy to other circuits for utilization.

Radio frequency oscillator 30 is tuned to a frequency of 5 megacycles, or the nearest exact multiple of 15,750 cycles. The tank coil 34 coupled to the pickup coil 37 feeds radio frequency sine wave energy to a series inductor 39 and a shunt capacitor 40. The junction between inductor 39 and capacitor 40 is connected to the anode of a reactance tube 87, which is in effect a variable capacitor in shunt with capacitor 40. The amount of the effective capacitance is thus controlled by the instantaneous value of the saw-toothed wave voltage fed to the controlled grid of tube 87 by inductor 43, capacitor 44, and resistors 42 and 45. A suitable direct current operating bias for tube 87 is provided by means of the voltage divider resistors 46 and 48 which provide a few volts steady positive bias, representing the normal operating point, to the cathode of tube 87. A by-pass capacitor 47 is provided, having a low impedance to the signal frequency so that the cathode and suppressor electrodes of tube 87 are at ground potential for signal frequencies.

Capacitor 44 presents a very low reactance to frequencies of 5 megacycles but is relatively an open circuit for the 15,750 cycle saw-toothed wave. The relative phase of the radio frequency grid and plate voltages of tube 87 is controlled by the resistance capacity combination of resistor 42 and capacitor 41, while inductor 43, capacitor 44 and resistor 45 provide a low pass filter network for impression of the 15,750 cycle saw-toothed wave on tube 87. The theory of operation of a reactance tube such as 87 is explained by Brainerd, Koehler, Reich and Woodruff in their book entitled "Ultra High Frequency Techniques," published by D. Van Nostrand Co.

The tuning of the combination of inductor 39 and capacitor 40 is, therefore, varied, and the phase of the 5 megacycle radio frequency voltage across capacitor 40 varies according to the saw-toothed wave function. This voltage is applied to the primary 49 of an aperiodic (untuned) radio frequency transformer, the impedance of primary 49 thereof being high compared to the impedance of capacitor 40 at 5 megacycles so that it has no important tuning effect. The secondary 50 of the radio frequency transformer feeds the deflection plates 62 and 63 of the cathode ray tube 59. The tube 59 is supplied with an anode voltage of 1000 volts or more direct current by a supply 55, a voltage divider 52—53 and filter capacitor 54 allowing a positive direct current voltage of about 400 volts to be applied to deflection electrodes 62 and 63 over transformer center tap 51. The +B voltage applied to the gun electrode 90 of tube 59 is approximately 300 volts.

An electrode 66 of the tube 59 is connected to the full anode supply voltage 55, while electrodes 64 and 65 are connected together to the junction of a voltage divider 57—58 and are supplied a somewhat lower voltage than that on electrode 66 but higher than the voltage applied to electrodes 62 and 63. Resistor 58 is shunted by capacitor 89. In operation, the cathode ray beam of tube 59 is swung back and forth across electrodes 64 and 65, and when the beam passes through the narrow slot between these electrodes, current will flow to electrode 66 and a narrow voltage pulse with a repetition rate of 5 megacycles and a phase depending on inductor 39, capacitor 40 and tube 87 will appear across the resistor 57, the voltage across resistor 58 being negligible due to the by-pass condenser 89.

Electron beam centering is provided by tilting the electron gun in tube 59 so that the cathode ray beam passes through the slot between electrodes 64 and 65 and then to electrode 66 only on one-half of the radio frequency cycle. This will avoid generating double frequency pulses as would be the case if the beam were not offset. This pulse voltage is coupled to the grid of a radio frequency amplifier tube 88 over condenser 56, which amplifies the pulses and feeds them to the transmission line A—A′.

Tube 88, which is of the beam power type, has a grid leak 67, a cathode bias resistor 68, and a cathode by-pass capacitor 69, having a low impedance for signal frequencies. Thus, the resistor 68 provides the normal direct current operating bias voltage for the tube, while the cathode and beam forming electrodes are maintained at ground potential as far as radio frequency is concerned, by the presence of capacitor 69. The plate of tube 88 is connected to one end of a radio frequency transformer primary winding 72. The other end of winding 72 is connected to the screen electrode of 88, the plate by-pass capacitor 70 and the plate filter choke 71. Thus, the screen electrode of tube 88 is maintained at nearly +B potential and is isolated from signal voltage changes by the capacitor 70. Plate supply voltage is fed to the plate of tube 88 through the choke coil 71 and the winding 72. The function of the choke coil 71 is to isolate the "B" supply from the signal voltages and to make capacitor 70 a more favorable ground return path for signal voltages.

The amplitude of the pulses is controlled by the video modulator tube 76, which could be a double triode of the type 6SN7–GT. The video output voltage of modulator 76 is fed to the control grid of tube 59 and, therefore, controls the beam current of tube 59 in accordance with the instantaneous value of the video signal being recorded. The video modulator is a two-stage amplifier of conventional design, utilizing "shunt peaking" as described by Pender and McIlwain in their Electrical Engineers Handbook on "Communication and Electronics," fourth edition, published by John Wiley and Sons, New York. The signal is fed to the input grid over the input coupling capacitor 74 and the grid leak 75. The lower end of 75 is connected via the bias battery 91 to ground. The input cathode is also connected to ground. The plate of the first amplifier section is provided with a shunt peaking coil 77, a plate load resistor 79, a plate filter resistor 80 and a plate by-pass capacitor 81. The output signal from the first plate is fed via the grid coupling capacitor 78 to the grid leak 82 and the grid of the second amplifier section. The lower end of the grid leak 82 is connected via the bias battery 92 to ground. The second cathode is also grounded.

The output plate of the modulator is provided with a shunt peaking coil 84, a plate load resistor 85, a plate filter resistor 86, and a plate by-pass capacitor 83. As shown by Pender and McIlwain, this amplifier may have a video voltage gain of about 10 times and a video bandwidth extending from 60 cycles to 4 or 5 megacycles. Thus, an input of one volt peak to peak of video signal to the modulator will cause a video voltage of 10 volts peak to peak to be applied to the grid of cathode ray tube 59 via the coupling capacitor 60 and the gridleak 61. Although one specific type of amplifier has been described, other types may also be used. If, in a practical design, the grid tube 59 should require more than 10 volts video voltage swing, more stages of amplification and larger video amplifier tubes can be provided by extension of the general principles just described.

The line B—B' is fed by a second identical cathode ray tube such as shown at 59, which is included in pulse generator unit 24. The operation of pulse unit 24, variable time delay 29, and modulator 22, is identical to that just described for the units feeding transmission line A—A', except that, owing to the action of polarity inverter tube 28, the phase of the pulses will vary in the opposite manner.

The actual design of cathode ray tube 59 may take various forms. By using a scanning beam of thin rectangular shape, instead of the usual circular shape, with the long side of the rectangle perpendicular to the paper, and by extending electrodes 64, 65, and 66 perpendicular to the paper a proportional amount, tube 59 can be designed to deliver peak pulse powers of several watts to the load resistor 57 or any necessary power required to drive amplifier tube 88.

Although one specific type of circuit is shown in Fig. 8, it is to be understood that the same result can be obtained by operating amplifier 88 as a plate modulated class "C" amplifier with the output of video modulator 21 applied to the plate of tube 88 instead of to the grid electrode of cathode ray tube 59, which would then be operated at a fixed value of beam current. Also, if a greater phase shift is required than that provided by inductor 39, capacitor 40, and tube 87, additional phase shift elements controlled by additional reactance tubes, all controlled by the same saw-toothed wave, can be connected in series to provide any desired amount of phase shift of the output voltage from the oscillator 30.

The pulse width, or the "mark" time of the pulse generated by the cathode ray tube 59, depends upon the percentage of the time the beam travels through the slot between electrodes 64 and 65 as compared to the total time of one radio frequency cycle. This can be controlled by the physical width of the slot and the magnitude of the radio frequency voltage applied to the deflection plates. Very narrow pulses of the order of millimicroseconds "mark" time can be generated by this method, since the time of one full sweep cycle of the beam of tube 59 is only 0.2 microsecond for an applied radio frequency voltage of 5 megacycles.

To explain the operation of the recording system by which the signals are recorded on a magnetic tape having a width of 35 mm., a horizontal television scanning frequency of 15,750 cycles per second and vertical frame frequency of 30 cycles per second for a 525-line television picture interlaced two to one will be considered. Also, we will assume that the effective video bandwidth to be recorded extends from 60 cycles to 4 megacycles. Under these conditions, each horizontal scanning line is capable of including approximately 400 picture elements.

Now, in order to avoid the recording of spurious magnetic dots in addition to the desired picture elements, a pair of pulses such as C and D of Fig. 4 must complete their travel across the tape in the time of one picture element or less. The velocity of pulse propagation across the tape will, therefore, be chosen so that one pulse will travel 3.5 cm. (35 mm.) in $\frac{1}{400}\times\frac{1}{15750}=0.16$ microsecond (approximately). This corresponds to a linear velocity of $V=S/t=3.5$ cm./$0.16\times10^{-6}$ sec.$=2.2\times10^{7}$ cm. per second as compared to $3\times10^{10}$ cm. per second for the velocity of light. This requirement is met by constructing lines A—A' and B—B' in the form of video delay lines, each with a time delay of 0.16 microsecond in a length of 35 mm. This can be done in a number of ways well known in the art. For instance, the velocity of propagation can be reduced from the speed of light by a factor of one over the square root of E, the dielectric constant, by filling the space between the transmission line conductors with a material whose dielectric constant E is greater than 1. Titanium dioxide, for example, has a dielectric constant of 100 or more, so that its use will allow a reduction of velocity by a factor of 10. If, in addition, the line conductors A—A' and B—B' are constructed as thin solenoids with many turns of wire on ferrite cores, the resulting increase in line inductance per unit length will further reduce the transmission velocity by a large factor.

Continuing the example, it is evident that if the time required for a pulse to travel 35 mm. across the tape is 0.16 microsecond, and it is desired to record as many as 400 picture elements in this distance, the pulse duration time is 0.16 microsecond/400, the pulse repetition rate being 5 megacycles per second. The deflection amplitude of tube 59 and the width of the slot between electrodes 64 and 65 in tube 59 would, therefore, be proportioned so that the scanning beam would enter the slot and reach electrode 66 for a little less than $\frac{1}{400}$ of the beam deflection period of 0.2 microsecond.

Another method of utilizing this scanning system involves the use of different velocities of transmission in the two lines A—A' and B—B'. For example, suppose line B—B' is constructed of bare copper wire so its transmission velocity approaches the speed of light ($3\times10^{10}$ cm./second) while line A—A' is constructed so that the velocity is very low, so that a pulse on A—A' travels the width of the tape in just $\frac{1}{15750}$ second, the time of a television scanning line. The system under these conditions reduces to the still simpler arrangement shown in the block diagram of Fig. 11.

Figure 11:
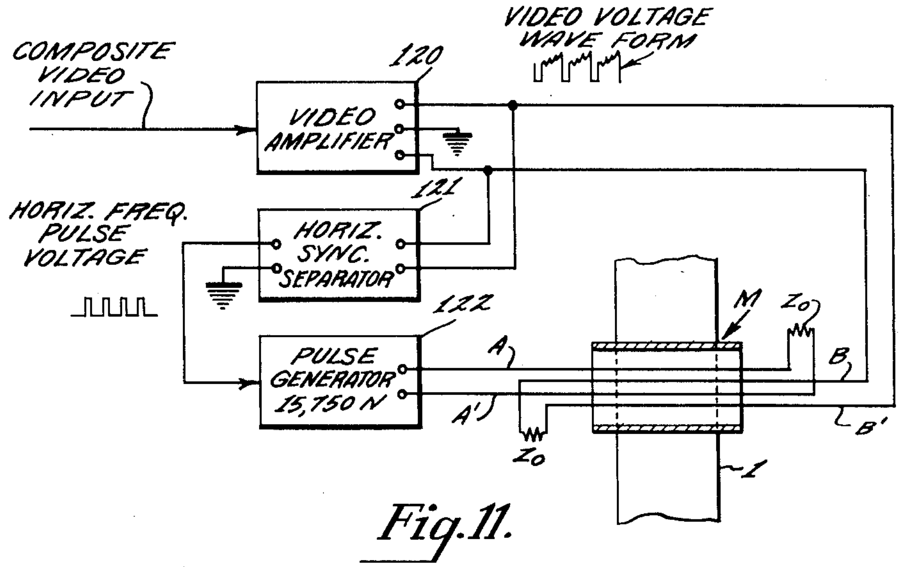
Fig. 11 is a diagrammatic view of a modification of the recording system shown in Fig. 7.

In Fig. 11, the composite video input from video amplifier 120 is applied directly to line B—B' and is propagated at a velocity approaching the speed of light across the tape 1. At the same time, the horizontal synchronizing signal pulses are separated from the video signal by separator 121, whose operation and construction are essentially the same as unit 25 in Fig. 7. The output pulses of 15,750 cycle frequency are fed to pulse generator 122, which feeds 15,750 cycle pulses of short duration to the line A—A', where they are propagated at a velocity slow enough to travel across the tape 1 in $\frac{1}{15750}$ second or 63.5 microseconds.

Figure 12:
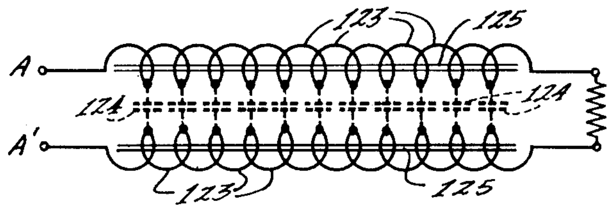
Fig. 12 is a diagrammatic view illustrating the operation of the recording system shown in Fig. 11.

Due to the large difference in velocity between the two transmission lines, it may be assumed for all practical purposes that the same instantaneous video current exists on line B—B' across the full width of the tape 1. The slow travelling narrow pulse travelling from left to right on A—A' will then cause flux to flow across gap 4 and video information to be recorded in a continuous line across the tape. For a value of picture resolution corresponding to 400 elements per line, the time duration of the "mark" portion of the pulse A—A' would be 63.5 microseconds/400=0.159 microsecond (approximately). The pulse generator 122 could be a cathode ray tube similar to tube 59 in Fig. 8 with deflection at a fixed rate of 15,750 cycles per second. The output of the unit 122 would be a pulse of steady amplitude with no modulation or phase shift required. The slow speed transmission line just described is shown diagrammatically in Fig. 12, where coils 123 represent many turns of fine wire, while 125 represents a high permeability core, such as ferrite, and the capacitors 124 indicate the shunt capacitance between the conductors.

Figure 13:
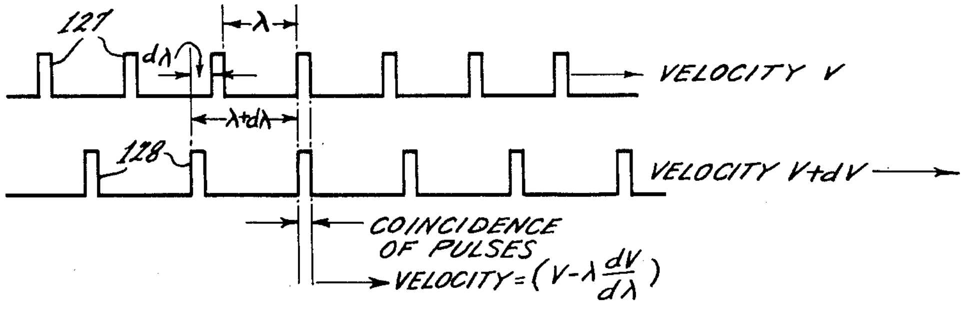
Fig. 13 is a graph illustrating the operation of the recording system shown in Fig. 11.

Another form of operation of the scanning device can be used to take advantage of the principle that the "form velocity" of the waves of the two transmission lines A—A′ and B—B′ may be much higher than the "group velocity" of the points where the individual pulses pass each other and cause magnetic picture elements to be recorded on the tape. This is illustrated in Fig. 13 where 127 indicates a train of pulses of wavelength $\lambda$ travelling from left to right at a velocity V. The pulses 128 represent a train having a wavelength $\lambda+d\lambda$ travelling at a velocity $V+dV$ from left to right. Thus, the velocity of the coincidence of the pulses is $V-\lambda dV/d\lambda$. Thus, by designing lines A—A′ and B—B′ for the desired value of $dV$ and properly adjusting the frequencies of the two trains of pulses, it is possible to cause magnetic scanning of the tape to progress at the desired low velocity. Both wavetrains 127 and 128 would be amplitude modulated by the video information to be recorded.

Figure 9:
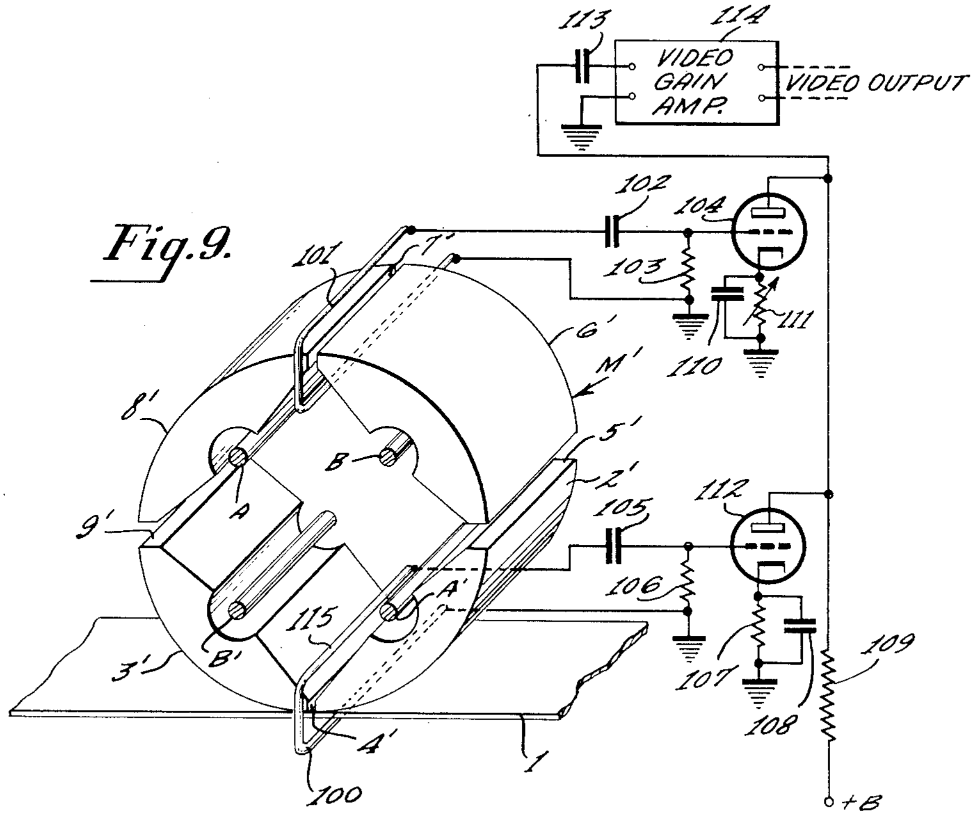
Fig. 9 is a combination schematic and perspective view of the preproducing magnetic head used in the invention.
Figure 10:
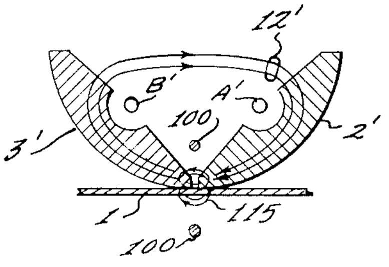
Fig. 10 is a partial cross-sectional view of the magnetic head shown in Fig. 9.

To detect or reproduce the signals recorded as described above, reference is made to Figs. 9 and 10, wherein a type of detecting head M′, having the same form of core sections as the recording head M of Fig. 1, is shown having core sections 2′, 3′, 6′, and 8′. The unit also has two narrow gaps 4′ and 7′, and two wider gaps 5′ and 9′, the tape being shown passing across the gap 4′. The same conductors A—A′ and B—B′ are also illustrated. In addition to these elements, the reproducer head includes a pickup coil 100 which encircles the gap 4′ and the tape 1. A similar pickup coil 101 encircles gap 7′ but not the tape 1. The conductors A—A′ and B—B′ are connected to pulse generators in a system such as shown in Fig. 7.

Now, when a pair of pulses pass each other in line A—A′ and B—B′, as shown in Fig. 4, there will be a sudden increase in flux from zero to some value depending on the strength of the pulses in both coils 100 and 101. The equal voltages so generated in the two coils are fed to the grids of tubes 104 and 112 in opposite phase, so that the resulting plate current changes are equal and opposite, and the output voltage drop across resistor 109 is zero. The signal from pickup coil 101 is fed over the coupling capacitor 102 and the gridleak 103 to the grid of amplifier tube 104. Tube 104 is shown as a triode tube, but a pentode or other suitable video amplifying tube can be used if desired. The cathode of tube 104 is connected to ground via the variable cathode resistor 111 and the signal by-pass capacitor 110. The function of resistor 111 is to provide a means of adjusting the effective negative grid bias of tube 104 so as to change its amplification to match its output with that of tube 112 whose plate is connected in parallel with that of tube 104 and to one end of the common plate resistor 109. Capacitor 105 and gridleak 106 perform the same function for tube 112 as capacitor 102 and gridleak 103 do for tube 104. The cathode bias resistor 107 has a fixed value, and the signal by-pass capacitor 108 in the cathode of tube 112 has the same value as capacitor 110.

The combined output voltage across the common plate resistor 109 of the two amplifier tubes 104 and 112 is fed via the capacitor 113 to video gain amplifier 114. Amplifier 114 comprises several video amplifying stages to bring the playback signal voltage at the output terminals up to a useful value for operation of a video monitor. For example, it may well provide enough amplification to give a video output voltage of 1.0 volt peak to peak alternating current and the amplifier output should preferably have an internal impedance of 75 ohms for feeding a coaxial cable. Amplifiers such as 114, having a frequency amplification band of from 60 cycles to 4 or more megacycles, are well known in the art and will not be described in detail here. The design of such amplifiers is given by Pender and McIlwain's Electrical Engineers Handbook, fourth edition, published by John Wiley and Sons, New York, section 7, pages 31 to 47.

During the detecting process, the amplitude of the pulses C and D are not modulated, a suitable fixed value of pulse current being used. Therefore, in the absence of a magnetized area in the gap 4′, and due to the balancing of the coil outputs, there will be no video voltages fed to the video gain amplifier 114 over condenser 113. However, when a small magnetized dot appears at gap 4′, the magnetization caused by the dot is illustrated at 115 in Fig. 10. The upper lines of force produced by the dot will either aid or oppose the flux 12′, being forced across the gap 4′, due to the coincidence of the two pulses on the line A—A′ and B—B′ at a point corresponding to the dot 115. There will, therefore, be a change in flux linkages in the coil 100 proportional to the strength of the magnetic dot. No such change will occur in coil 101, and consequently a video voltage proportional to the magnetic strength of the dot will appear in the output terminals of amplifier 114. If the complete line of magnetic video information as shown in Fig. 6 is in the gap 4′, then by means of the scanning process, whereby pairs of pulses of fixed amplitude are brought into coincidence in regular sequence from left to right across the tape 1, the form of the voltage at amplifier 114 will be the same as H in Fig. 6.

There is thus provided a magnetic video recording and reproducing system which fully utilizes a magnetic recording medium. This permits the medium to be advanced at normal sound record speeds whereby picture information can be stored on much less of the medium than heretofore.

I claim:

1. A television recording system for recording signals on a magnetic medium from a source of video signals comprising a magnetic recording head for cooperating with said medium having a plurality of sectors, two pairs of transmission lines passing through said sectors, the plane of one of said pairs of lines being at right angles to the plane of said other pair of lines, means for generating pulses at one end of each of said lines, means for causing said pulses to travel in opposite directions over said transmission lines, the passing of said pulses introducing a travelling magnetic field along a gap between two of said sectors, said last-mentioned means including a saw-toothed wave generator, a pair of time-delay units for varying the rate of propagation of pulses from said pulse generators over said conductors, and means for impressing said video signals on said pulses for variably magnetizing said magnetic medium at said gap in accordance with the amplitude of said video signals when said pulses pass each other along said lines.

2. A television recording system in accordance with claim 1, in which said means for generating pulses includes a cathode ray tube having triple anodes, two of said anodes being spaced to form a gap therebetween and said third anode being positioned behind said gap.

3. A television recording system in accordance with claim 1, in which said means for causing said pulses to travel in opposite directions over said transmission lines includes a polarity inverter connected between said saw-toothed wave generator and one of said time-delay units, the other of said time-delay units being connected directly to said saw-toothed wave generator, and an oscillator connected to said time-delay units.

4. A television recording system in accordance with claim 3, in which said variable time-delay units are connected to said means for generating pulses.

5. A television system for recording video signals on a magnetic medium and detecting said signals from a source of video signals comprising a magnetic recording head having a plurality of gaps therein, one of which is adapted to be brought in contact with said magnetic medium, two pairs of transmission lines passing through said head, the plane of one pair of lines being at right angles to the plane of said other pair of lines, means at each end of each transmission line for generating voltage pulses for producing a magnetic field in said medium, means for connecting said source of video signals to said generators, a detecting unit comprising a magnetic head having a plurality of gaps, one of which is in contact with said magnetic medium, a conductor surrounding said gap and said medium, and a second conductor surrounding a gap in said head diametrically opposite said gap in contact with said medium, and means for neutralizing the magnetic field produced by said pulses and recorded on said medium, said means detecting the video signals recorded on said medium.

6. A television system in accordance with claim 5, in which means are provided for propagating said magnetic field transversely of said medium.

7. A television system in accordance with claim 5, in which said reproducing unit includes a pair of vacuum tubes, each of which is connected to one of said conductors surrounding said gaps, said tubes being balanced for the magnetism in said medium produced by said pulse generator means.

8. A video magnetic recording system for recording signals on a magnetic medium from a source of video signals comprising a magnetic head adapted to be brought in contact with said medium and including a plurality of sectors, two pairs of transmission lines within said head and having the planes of said pairs of lines disposed at right angles to one another, a pulse generator connected to one end of each of said lines for creating a travelling magnetic field along each of said lines, means for causing said pulses to travel in opposite directions along said lines, the passing of said fields magnetizing said medium at the point of passing, and means for connecting said source of video signals to said pulse generators.

9. A video magnetic recording system in accordance with claim 8, in which said head includes four sectors having an air core and four gaps, two of said gaps being of the same size and wider than the other two gaps of the same size.

10. A video magnetic recording system for recording signals on a magnetic medium from a source of video signals comprising a magnetic head adapted to be brought in contact with said medium, two pairs of transmission lines through said head, one pair of said lines having a high rate of pulse propagation and the other pair of said lines having a slow rate of pulse propagation, means for connecting said source of video signals to one end of said high speed pair of lines, a pulse generator, and means for connecting the output of said pulse generator to one end of said slow speed pair of lines and the input of said pulse generator to said source of video signals.

11. A video magnetic recording system in accordance with claim 10, in which said pair of slow speed lines connected to said pulse generator is wire wound around a core to introduce a predetermined delay of pulse propagation therein.

12. A video magnetic recording system in accordance with claim 11, in which a dielectric material having a dielectric constant greater than one is disposed between the conductors of each transmission line.

13. A television recording system for recording signals on a magnetic medium from a source of video signals comprising a magnetic recording head having a gap adapted to be brought in contact with said medium, two pairs of transmission lines axially passing through said head, the plane of one of said pairs of lines being at right angles to the plane of said other pair of lines, and means for generating pulses at one end of each of said pairs of lines for travelling along respective lines, the coincidence of said pulses within said head producing a magnetic field in said medium at said gap in contact with said medium.

14. A television recording system in accordance with claim 13, in which means are provided for propagating said pulses in opposite directions along said lines, said means including a saw-toothed wave generator, a polarity inverter connected to said wave generator, time-delay units, means for directly connecting said wave generator to one of said units and to one of said pulse generators, and means for connecting said other unit to said polarity inverter and to said other pulse generator.

15. A television recording system in accordance with claim 13, in which means are provided for propagating said pulses in the same direction along said lines, one of said means generating a pulse of wavelength $\lambda$ with a velocity V on one of said pair of lines and the other of said means generating a pulse of wavelength $\lambda + d\lambda$ with a velocity of $V + dV$ on the other of said pair of lines, the coincidence of said pulses producing a travelling magnetic field transversely of said medium having a velocity of $$V - \lambda \frac{dV}{d\lambda}$$

16. A television transducing system using a magnetic medium and a source of video signals comprising a magnetic recording head having a gap adapted to be brought into contact with said magnetic medium, two pairs of parallel electrical transmission lines axially positioned within said head, the plane of one pair of said lines being substantially at right angles to the plane of said other pair of said lines, individual means connected to each end of each of said pairs of lines for generating voltage pulses to produce a travelling magnetic field in said medium, means for connecting said source of video signals to said generating means for recording said video signals with said travelling magnetic field, a detecting unit including a magnetic head of the type of said recording head, said detecting head having a gap adapted to be brought into contact with said medium, a conductor surrounding said gap and said medium at said gap, said magnetic field and video signals being inducted into said conductor, and means for neutralizing said magnetic field to obtain said video signals.

17. A television transducing system in accordance with claim 16 in which said recording and detecting heads each have a plurality of gaps therein, two of said gaps of each head being positioned diametrically opposite one another, said neutralizing means including a second conductor surrounding the gap in said detecting head diametrically opposite said gap in contact with said medium.

18. A television transducing system in accordance with claim 17 in which said recording and detecting heads each have four sectors having an external cylindrical configuration with gaps between adjoining sectors, two diametrically opposite gaps being wider than the other diametrically opposite gaps.

19. A system for detecting video signals in a magnetic medium comprising a magnetic head having a plurality of gaps, one of said gaps being adapted to be brought in contact with said magnetic medium, two pairs of transmission lines positioned within said head, one pair of lines being in a plane substantially at right angles to the plane of said other pair of lines, means for generating voltage pulses at the one end of each of said lines to produce a travelling magnetic field in said medium, a conductor surrounding said gap and said medium at said gap, and a second conductor surrounding another gap in said head diametrically opposite said gap adapted to be brought in contact with said medium, said conductors neutralizing said magnetic field.

20. A system in accordance with claim 19 in which said head is composed of four similar shaped sectors having a cylindrical exterior, said sectors being composed of finely-divided electrolytic iron and being separated within said head, the space between said sectors within said head being of non-magnetic material of a dielectric nature.

21. A system in accordance with claim 19 in which said head is provided with narrow gaps diametrically opposite one another and wider gaps diametrically opposite one another and at right angles to the narrower gaps.

22. A system for recording a video signal on a magnetic medium comprising means for advancing said magnetic medium, a video signal amplifier, and means for transducing the applied video signal from said amplifier into a pair of magnetic fields travelling transversely of said medium, one of said fields being insufficient to magnetize said medium, said medium being magnetized when said fields are superimposed.

23. A system in accordance with claim 22 in which means are provided for propagating said fields in opposite directions transversely of said medium, the generation of each field being delayed the same amount in reverse directions.

24. A system in accordance with claim 22 in which means are provided for propagating one of said fields at a slow rate of speed compared to the rate of propagation of said other field.

25. A system in accordance with claim 22 in which means are provided for propagating said fields in the same direction transversely of said medium, one of said fields travelling at a velocity of V and the other of said fields travelling at a velocity of $V+dV$, the coincidence of said fields travelling at a velocity of $$V-\lambda\frac{dV}{d\lambda}$$

26. A magnetic head comprising a plurality of magnetic core sectors having an exterior cylindrical configuration and an interior opening, gaps being positioned between adjacent edges of said sectors, certain of said gaps being wider than others to provide high reluctance paths between certain sectors.

27. A magnetic head in accordance with claim 26 in which said sectors are formed of finely-divided electrolytic iron and said opening comprises non-magnetic material of a dielectric nature.

28. A magnetic head in accordance with claim 26 in which two pairs of parallel electrical pulse transmission lines are axially positioned within said opening to produce separate magnetic fields substantially 90° apart.

29. A magnetic head in accordance with claim 26 in which a pair of gaps of the same width are positioned diametrically opposite one another.

No references cited.